United States Patent
Itoh et al.

(10) Patent No.: US 7,318,021 B2
(45) Date of Patent: Jan. 8, 2008

(54) MACHINE TRANSLATION SYSTEM, METHOD AND PROGRAM

(75) Inventors: Hiroshi Itoh, Sagamihara (JP); Tomohiro Miyahira, Yamato (JP)

(73) Assignee: International Business Machines Corporation, Armonk, NY (US)

( * ) Notice: Subject to any disclaimer, the term of this patent is extended or adjusted under 35 U.S.C. 154(b) by 1014 days.

(21) Appl. No.: 10/085,379

(22) Filed: Feb. 28, 2002

(65) Prior Publication Data

US 2002/0161569 A1 Oct. 31, 2002

(30) Foreign Application Priority Data

Mar. 2, 2001 (JP) ............................. 2001-059031

(51) Int. Cl.
*G06F 17/28* (2006.01)
(52) U.S. Cl. ............................................. 704/5; 704/7
(58) Field of Classification Search .................... 704/9, 704/5
See application file for complete search history.

(56) References Cited

U.S. PATENT DOCUMENTS

| | | | | |
|---|---|---|---|---|
| 5,991,713 A | * | 11/1999 | Unger et al. ................... 704/9 |
| 6,064,951 A | * | 5/2000 | Park et al. ..................... 704/8 |
| 6,085,162 A | * | 7/2000 | Cherny ....................... 704/277 |
| 6,119,078 A | * | 9/2000 | Kobayakawa et al. ......... 704/3 |
| 6,282,508 B1 | * | 8/2001 | Kimura et al. ................ 704/10 |
| 6,360,196 B1 | * | 3/2002 | Poznanski et al. ............. 704/3 |
| 6,615,168 B1 | * | 9/2003 | Resnik et al. .................. 704/8 |
| 6,772,139 B1 | * | 8/2004 | Smith, III ...................... 707/3 |
| 6,789,057 B1 | * | 9/2004 | Morimoto et al. ............. 704/2 |
| 6,993,471 B1 | * | 1/2006 | Flanagan et al. .............. 704/2 |
| 6,993,473 B2 | * | 1/2006 | Cartus ........................... 704/2 |
| 7,058,626 B1 | * | 6/2006 | Pan et al. ....................... 707/4 |
| 2002/0099533 A1 | * | 7/2002 | Jaqua ........................... 704/1 |
| 2002/0116420 A1 | * | 8/2002 | Allam et al. ................ 707/526 |

FOREIGN PATENT DOCUMENTS

| | | |
|---|---|---|
| JP | 06-060117 | 3/1994 |
| JP | 10-021222 | 1/1998 |
| JP | 2001-101185 | 4/2001 |

* cited by examiner

*Primary Examiner*—David Hudspeth
*Assistant Examiner*—Matthew J. Sked
(74) *Attorney, Agent, or Firm*—Pastel Law Firm; Christopher R. Pastel (57) ABSTRACT

A translated text creator translates a text in which an unknown word is left in an original language representation without being translated, while known words are translated. Translated text created by the translated text creator is displayed. A link setter sets a link for performing a search for the unknown word in a search field of a selected Internet search engine which corresponds to a field of a subject matter of the original text.

24 Claims, 9 Drawing Sheets

| HONYAKU NO OOSAMA (KING OF TRANSLATION) | SEARCH ENGINE 1 | SEARCH ENGINE 2 |
|---|---|---|
| Supootsu (Sports) | Sports | Sports |
| Aato (Arts) | Arts | Arts + Culture |
| Seiji (Politics) | Goverment | Library / Goverment &Politics |
| Bijinesu (Business) | Business | Work + Money |
| Entaateimento (Entertainment) | Entertainment | Entertainment |
| Intaanetto Ippan (Whole Internet) | Computer + Internet | Computing |

FIG. 3

ENGLISH → JAPANESE — 27

Golf News

Hiro Itoh Won Golf Championship

Greenlake, Scotland, Jan. 26 -- Hiro Itoh won the 38th Golf Championship with the best record of 18-shot runaway. At the final 7-holes, Itoh had incredible 5 birdies and 2 eagles, while Tomo Miyahira and Masa Suzuki had only 3 birdies respectively.

FIG. 4

ENGLISH → JAPANESE — 27

Gorufu·Nyuusu

Hiro Itoh, Gorufu-Sensyuken Yuushoo

28a — Greenlake, Sukottorando, 1gatsu 26niti -- Hiro Itoh ga Dai38kai-Gorufu-Sensyuken de 18dasa de yuusyoo — 28b
28c — shimashita. Saigo no 7hooru de, Tomo Miyahira to Masa Suzuki wa sorezore wazuka 3baadi datta nimo kakawarazu, Itoh wa, kyooitekina 5baadi 2iiguru deshita.

FIG. 5

ENGLISH → JAPANESE — 27

Search Result: "Tomo Miyahira"

1. Sports - Golf News
   Sports news about golf
   URL http://www.OOO.com/person/miyahira 2. Who's Who in Sports
   Who's who in sports area
   URL http://www.☐☐☐.com/sports/golf/

3. Learn about Golf
   All books about golf
   URL http://www.△△△.com/golf next →

FIG. 6

ENGLISH → JAPANESE — 27

Sports news about golf

Today's news
- 
- 
-

★. Tomo Miyahira:
He is one of the best golf players in the world from 1990's. Born in Japan in 1970 and now staying in the United states to participate in US PGA tour.
Main first prizes he took are ···
His URL -> http://www.OOO.com/miyahira/

ENGLISH → JAPANESE  — 27

Gorufu kanren no Supootsu nyuusu

Kyoo no nyuusu
- 
- 
-

★. Tomo Miyahira:
Kare wa, 1990nendai kara taitoo shita, sekai de mottomo
sugureta gorufu-pureeyaa no hitori. 1970nen ni Nihon de
umare, genzai wa, US no PGAtsuaa ni sanka suru tame,
Beikoku ni zaijuu shiteiru.
Omona yuushooreki wa, ···
Kare no URL wa -> http://www.○○○.com/miyahira/  — 30
- 
- 
-

FIG. 8

ENGLISH → JAPANESE — 27

Miyahira Tomohiro no HPpeeji ni yookoso

★Kyoo no tsuaa no kekka dayo
★Purofiiru
★Boku no sundeiru ie no shashin
★Keijiban desu
★Meeru wo kudasai
★Rinku
- 
- 
-

MACHINE TRANSLATION SYSTEM, METHOD AND PROGRAM

FIELD OF THE INVENTION

The present invention relates to a machine translation system, method and program in which a text in a first language is translated into a text in a second language using at least one dictionary. More particularly, the invention relates to a machine translation system, method and program which can appropriately manage a situation where a word not registered in the at least one dictionary is contained in the text in the first language.

BACKGROUND OF THE INVENTION

English-to-Japanese translation software entitled "Internet King of Translation" sold in Japan by the assignee of the instant application includes, in addition to a system (basic) dictionary, six dictionaries classified by the fields of "Sports", "Arts", "Politics", "Business", "Entertainment" and "Internet", as well as a user dictionary whose translation words may be edited, from time to time, by a user. This software translates English sentences into Japanese sentences by using the translation words in these dictionaries.

Several machine translation systems have been known in which domain dictionaries are automatically switched or changed. For example, the machine translation system disclosed in Japanese Unexamined Patent Publication No. 6-60117 analyzes the sentence structure of an original text, checks whether or not translation words in each sentence exist in the respective domain dictionaries, increments translation word check counters corresponding respectively to the dictionaries in which translation words have existed, and sets selection priority of the domain dictionaries depending on numeric count values of the translation word check counters. Also, in the machine translation system disclosed in Japanese Unexamined Patent Publication No. 10-21222, a condition for translation processing is defined based on document identification information which is determined when a document in a first language is accessed. In one embodiment thereof, a particular domain or field is determined by using an Internet URL as the document identification information, and a domain dictionary corresponding thereto is selected.

In conventional machine translation systems, any word not registered in the dictionaries (hereinafter referred to as "unknown word") cannot be translated. Therefore, a user must consult, for example, a paper dictionary for an appropriate translation word or equivalent for the unknown word, which would result in inefficient and inconvenient translation word searching.

OBJECTS AND SUMMARY OF THE INVENTION

It is a primary object of the present invention to provide a machine translation system, method and program which permit a user to efficiently search for a translation word when a word exists that is not registered in at least one dictionary installed on the machine translation system.

It is another object of the invention to provide a machine translation system, method and program which can register a translation word in a dictionary when a translation word for an unknown word contained in an original text is found.

In accordance with one embodiment of the invention, there is provided a machine translation system comprising a translated text creator for creating a translated text in which an original text in a first language is translated into the translated text in a second language while an unknown word not registered in at least one dictionary is left in the first language. A translated text display may be used for displaying the translated text created by the translated text creator. A link setter may be used for setting a link for the unknown word in the first language in the translated text displayed by the display for which an instruction is provided, such that a search for the unknown word in the first language is conducted using the unknown word as a search word in a predetermined Internet search engine based on the first language.

In accordance with another embodiment of the invention, there is provided a machine translation method comprising creating a translated text in which an original text in a first language is translated into the translated text in a second language while an unknown word not registered in at least one dictionary is left in the first language, displaying the translated text and setting a link for the unknown word in the first language in the translated text being displayed for which an instruction is provided, such that a search for the unknown word in the first language is conducted using the unknown word as a search word in a predetermined Internet search engine based on the first language.

In accordance with yet another embodiment of the invention, there is provided a machine translation program usable by a computer to cause the computer to create a translated text in which an original text in a first language is translated into the translated text in a second language while an unknown word not registered in at least one dictionary is left in the first language, display the translated text and set a link for the unknown word in the first language in the translated text being displayed for which an instruction is provided, such that a search for the unknown word in the first language is conducted using the unknown word as a search word in a predetermined Internet search engine based on the first language.

DETAILED DESCRIPTION OF THE INVENTION

For a better understanding of the present invention, together with other and further objects, advantages and capabilities thereof, reference is made to the following disclosure and appended claims in connection with the above described drawings.

The first and second languages usable herein may be, for example, English and Japanese, respectively, however the invention is not restricted to these. Typical Internet search engines in English are, for example, "Yahoo!" and "AltaVista". In setting a link for an unknown word in an original language representation to an Internet search engine, an anchor tag for executing a search by specifying the unknown word as a parameter to a search engine CGI is described, for example. The unknown word may not only be a word but also a compound word. The source of the original text is not restricted to an Internet Web page. It may also be a file stored on a storage device of a personal computer or an input from a character recognition device or a speech recognition device, for example.

When a user instructs that a search for an unknown word in an original language representation be performed by, for example, clicking a mouse, the search for the unknown word is carried out by an Internet search engine, and information about a translation word for the unknown word may be obtained. In this way, a user may efficiently find an appropriate translation word for an unknown word not found in dictionaries of the machine translation system without seeking out a translation word in a paper dictionary.

In conventional Internet search engines, searches classified by fields can be made in order to perform efficient searches. "Yahoo!", which is an English language Internet search engine, for example, has search fields of: "Sports", "Arts", "Government", "Business", "Entertainment", "Computers", "Internet", etc. as of February 2001. Also, "AltaVista", another English language Internet search engine has search fields of: "Sports", "Arts", "Culture", "Government", "Politics", "Work", "Money", "Entertainment", "Computing", etc. as of February 2001.

The method for detecting a field relevant to a subject matter of an original text may be not only the one disclosed in Japanese Unexamined Patent Publication No. 6-60117 or Japanese Unexamined Patent Publication No. 10-21222 mentioned above, but also the technique of Japanese Patent Application No. 11-270212 filed by the same assignee as that of the instant application. According to the method of the latter application, any compound word used in the original text is sought out, it is determined in which domain dictionary the compound word is registered and the field of the domain dictionary in which the compound word is registered is set as the subject matter field of the original text. When the names of the fields of the domain dictionaries installed in a machine translation system do not agree with those of the search fields of the Internet search engine, the link for an unknown word in an original language representation is set to that search field of the Internet search engine which is closest to containing the field of the relevant domain dictionary.

A search by an Internet search engine for an unknown word is performed in a search field corresponding to a field relevant to a subject matter of the original text containing this unknown word, so that a more appropriate translation word may be efficiently found.

There are a number of Internet search engines at present. From time to time, a user knows information about which Internet search engine can efficiently find an appropriate translation word, and wishes to occasionally change the Internet search engine to which a link is set. Therefore, a user is permitted to change the Internet search engine for executing a search for an unknown word, through a search engine changer, with the result being that a user may efficiently find an appropriate translation word. Furthermore, it is advantageous that a user may specify an Internet search engine for a given subject matter field, for example, Internet search engine "X" for field A, and Internet search engine "Y" for field B.

There are also a number of Internet search engines at present, which may search by field, but search capabilities of these Internet search engines may vary depending upon search fields. It is accordingly advantageous to have, for each field, an Internet search engine with a high search capability search for an unknown word in this field. Thus, the efficiency of a translation may be improved by setting a link to an Internet search engine most suited to find a translation word in a particular field of an unknown word.

In the present invention, a user may efficiently register a translation word for an unknown word in a dictionary. In a translation after a registration, a word which was unknown before the registration is translated as a known word. After a translation word registration, a user may instruct re-translation of an original text to obtain a translated text containing a smaller number of unknown words.

In a machine translation system which selectively uses domain dictionaries depending on a subject matter field of an original text to enhance the quality of a translated text, a field relevant to a subject matter of the original text to be translated is detected to select an appropriate domain dictionary (as described in, for example, in Japanese Unexamined Patent Publication No. 6-60117, Japanese Unexamined Patent Publication No. 10-21222 or Japanese Patent Application No. 11-270212). Therefore, a field relevant to a subject matter of an original text containing an unknown word may be easily detected by checking which of the domain dictionaries is currently being used by a machine translation system.

A dictionary in which a translation word for each unknown word is registered in association with a field relevant to a subject matter of an original text containing that unknown word, is prepared as a dictionary in which a user may edit translation words for unknown words and unknown compound words. This user editable dictionary may be either a plurality of user dictionaries prepared for respective fields, or a single dictionary in which unknown words and translation words are registered along with information for associating an original or translation words with respective fields.

Since an appropriate translation word for a given word may vary depending on a field of the word, translation words for unknown words are registered by field, so that translation quality may be enhanced relative to registering translation words in a dictionary without specifying a field.

When a language is the native language of a user, it may be more efficient to read a Web page displayed by the unknown word related Web page display in this native language, rather than trying to read the Web page in another language with which the user is not familiar.

Further definition of the present invention will now be provided with respect to the drawings.

Figure 1:
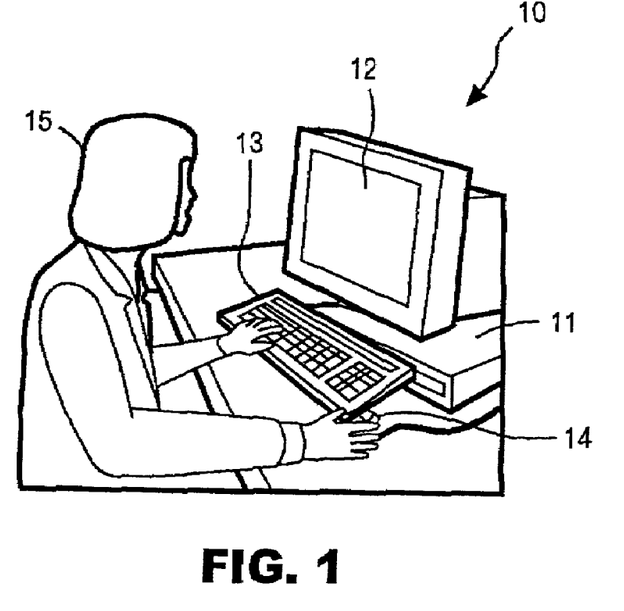
FIG. 1 is a diagram showing a user utilizing a machine translation system according to one embodiment of the invention to translate an English language Web page found on the Internet.

FIG. 1 is a diagram showing a user 15 utilizing a machine translation system to translate an English language Web page found on the Internet. Personal computer (hereinafter referred to as "PC") 10 includes display 12, keyboard 13 and mouse 14 which are connected to computer system unit 11. English-to-Japanese translation software, for example "Internet King of Translation" sold in Japan by the assignee of the instant application, is installed on computer system unit 11, along with Web browser software. While viewing the display 12, user 15 provides instruction to PC 10 through the operation of keyboard 13 and mouse 14. The preferred embodiments of the invention will be described hereinafter assuming that user 15 speaks Japanese as a native language.

Figure 2:
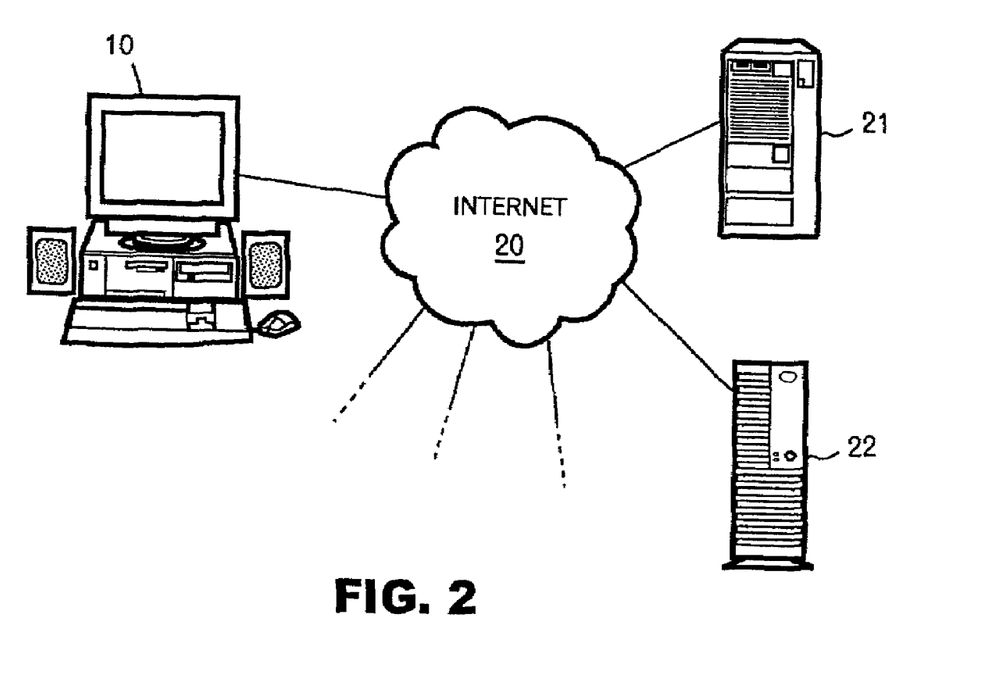
FIG. 2 is a schematic view of the Internet.

FIG. 2 is a schematic view of the Internet 20. PC 10 is connected to Internet 20 through a modem (not shown) or the like. Various servers including search engine servers 21, 22 are connected to Internet 20.

Figure 3:
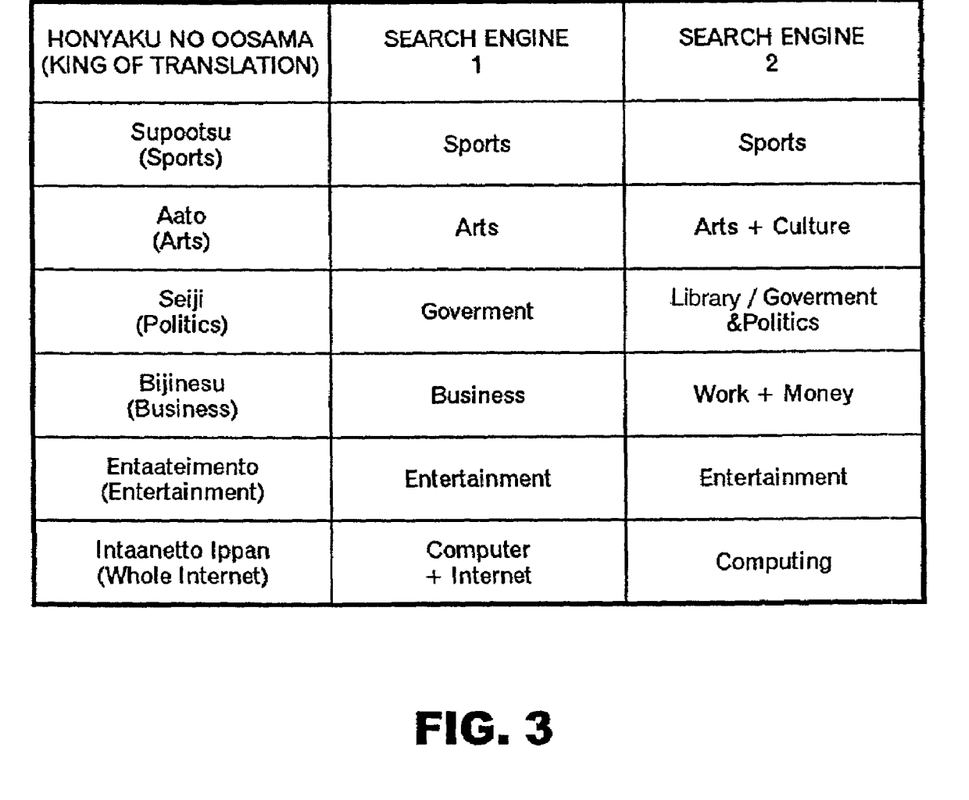
FIG. 3 is a diagram showing relationships between subject matter fields of domain dictionaries in an English-to-Japanese translation system and search fields of two search engines according to one embodiment of the invention.

FIG. 3 is a diagram showing relationships between subject matter fields of domain dictionaries in an English-to-Japanese translation system entitled "Internet King of Translation" (hereinafter referred to as "English-to-Japanese translation system concerned") and search fields of two search engines. As shown in the left-hand column in FIG. 3, the English-to-Japanese translation system concerned includes English-to-Japanese dictionaries for the subject matter fields of "Supootsu (Sports)", "Aato (Arts)", "Seiji (Politics)", "Bijinesu (Business)", "Entaateimento (Entertainment)" and "Intaanetto (Internet)". The search fields of two English language search engines are shown in the middle and right-hand columns in FIG. 3. Although the search fields of these search engines are independently set, it is possible for the search fields to correspond to subject matter fields of the domain dictionaries in the English-to-Japanese translation system concerned. The search fields that correspond to subject matter fields of the English-to-Japanese translation system concerned are shown in the same rows in FIG. 3. The subject matter fields that correspond to the search fields in FIG. 3 are as follows: "Supootsu" of the English-to-Japanese translation system concerned corresponds to the search field "Sports" of both Search Engine 1 and Search Engine 2, "Aato" corresponds to "Arts" of Search Engine 1 and "Arts+Culture" of Search Engine 2, "Seiji" corresponds to "Government" and "Library/Governments & Politics", "Bijinesu" corresponds to "Business" and "Work+Money", "Entaateimento" corresponds to "Entertainment" of both Search Engines and "Intaanetto Ippan" corresponds to "Computers+Internet" and "Computing".

Figure 4:
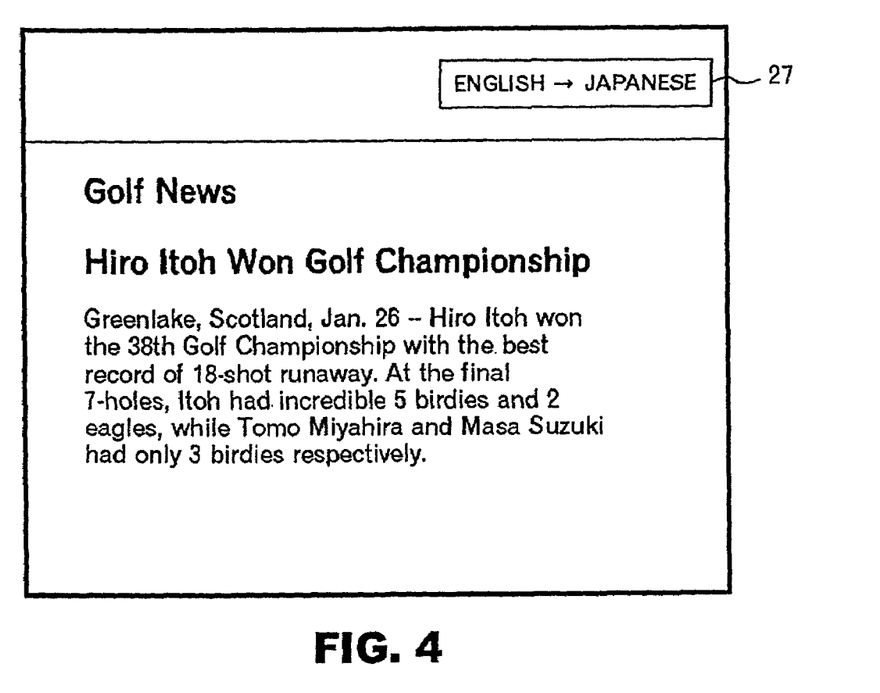
FIG. 4 is a diagram showing a window where an English language Web page is displayed according to one embodiment of the invention.
Figure 5:
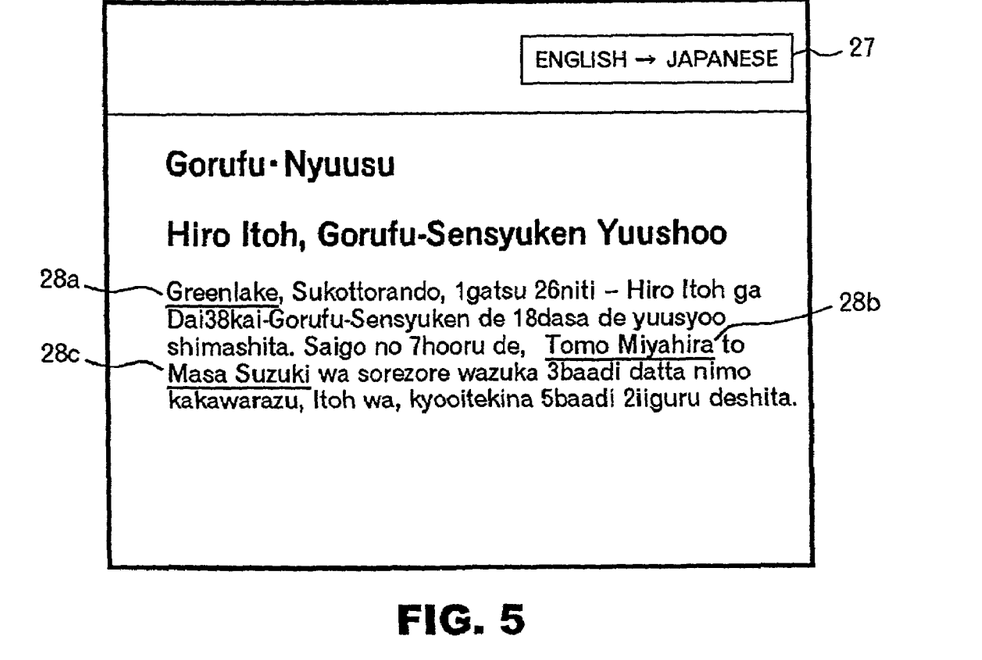
FIG. 5 is a diagram showing a window displayed when a translation execution button is clicked in the window of FIG. 4 according to one embodiment of the invention.

FIG. 4 is a diagram showing a window where an English language Web page is displayed on display 12. The user 15 can instruct translation of the English language text by clicking, with mouse 14, translation execution button 27 at the upper right part of the window. The English language text in FIG. 4 is translated by the English-to-Japanese translation system concerned, and a window shown in FIG. 5 is displayed on display 12, as a foreground window relative to the window of FIG. 4, in which translated Japanese language text, produced by the English-to-Japanese translation system concerned, is shown. In the translated text displayed in the window of FIG. 5, hypertext links are underlined to alert user 15 to the presence thereof.

In order to enhance the quality of translation, the English-to-Japanese translation system concerned translates the original English language text such that a field relevant to a subject matter of the original text (shown in the left-hand column in FIG. 3) is detected in accordance with a predetermined algorithm, and that a domain dictionary corresponding to the detected field is used prior to a system (basic) dictionary in which general translation words, grammatical rules and examples of uses are registered. The English-to-Japanese translation system concerned provides a system dictionary 48a, domain dictionaries 48b and a user dictionary 48c as will be explained below with reference to FIG. 14. The English-to-Japanese translation system concerned starts the translation of the original text with dictionary usage priority set in the order of user dictionary 48c, system dictionary 48a and domain dictionaries 48b, as no field has been specified at the start of the translation. A method for detecting a field relevant to a subject matter of a range of text to be translated in the original text is, for example, detecting compound words. "Hiro Itoh" in the original text in FIG. 4 is assumed to be a world-famous golf player. The English-to-Japanese translation system concerned detects "Hiro Itoh" as a compound word in the original English language text, searches the domain dictionaries to determine in which dictionary the compound word is registered and finds that the compound word is registered in the sports domain dictionary. The English-to-Japanese translation system concerned, having determined that sports is the subject matter field of the original text, alters the usage priority of the domain dictionaries so as to use words registered in the sports domain dictionary prior to using words registered in the system dictionary, and translates the original English language text shown in FIG. 4 into a translated Japanese language text. In the translated Japanese language text shown in FIG. 5, it is assumed that unknown words 28a, 28b and 28c are not registered in the sports domain dictionary, or any of the other dictionaries, in the English-to-Japanese translation system concerned at the time of initial translation. Consequently, unknown words 28a, 28b and 28c are displayed in the window of FIG. 5 in the original English language representations without being translated. The user 15 knows, by seeing the original language representations in the window of FIG. 5, that the unknown words 28a, 28b and 28c are not registered in the dictionaries of the English-to-Japanese translation system concerned. However, a hypertext link is set for each of the unknown words 28a, 28b and 28c. In these links, a search field of a predetermined Internet search engine is associated with the field of the domain dictionary used for translating the original text, for example, in accordance with the table shown in FIG. 3. The unknown words in the translated text are underlined to indicate that a link has been set for each of the unknown words, alerting user 15 to the presence of these links. As explained above, an anchor tag for executing a search by specifying the unknown word as a parameter to a search engine CGI is defined for the respective links of the unknown words. For example, for unknown word 28b, "Tomo Miyahira", the respective link is set to the following anchor tag:

<A href="http://search.①①①.com/bin/search?p=%22Tomo%20Miyahira %22&r=Sports">Tomo Miyahira</A>

Figure 6:
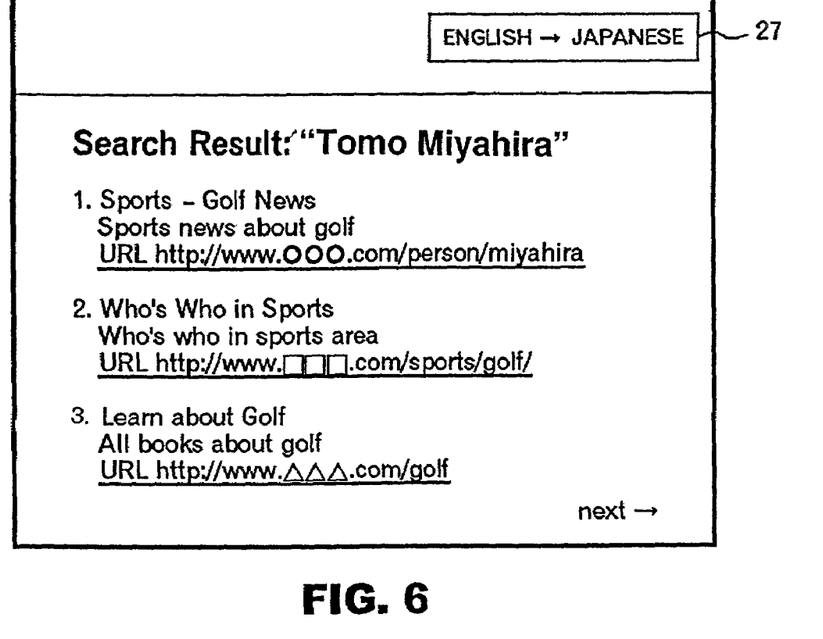
FIG. 6 is a diagram showing a window displayed when an unknown word is clicked in the window of FIG. 5 according to one embodiment of the invention.
Figure 7:
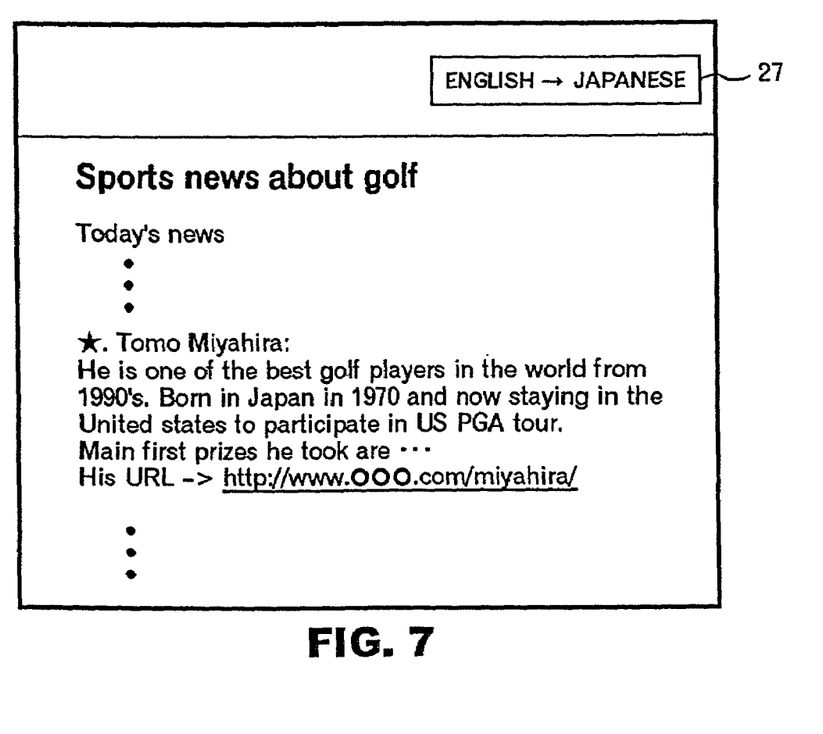
FIG. 7 is a diagram showing a window displayed when a URL is clicked in the window of FIG. 6 according to one embodiment of the invention.

The Internet search engine in a link for an unknown word may be specified to be, for example, Search Engine 1 or Search Engine 2 shown in FIG. 3, and may not be changed once a link is set, irrespective of the search field; however a different search engine may be specified for each search field when a link is initially set. In the translated text displayed in the window of FIG. 5, three unknown words are present, and user 15 may click the unknown words in the original language representation in any order desired. When an unknown word is clicked, a search is conducted using the unknown word as a search word in the search field of the Internet search engine to which the unknown word is linked, and a search result list is displayed. Assuming that user 15 has clicked unknown word 28b, "Tomo Miyahira", in the window of FIG. 5, a search result list window shown in FIG. 6 is displayed as a foreground window on display 12 (FIG. 1). Uniform Resource Locators (hereinafter referred to as "URLs") of a plurality of Web pages relevant to the search word are listed and displayed in descending order of relevancy. The search result list is displayed in the window of FIG. 6. The user 15 may click any of the URLs in the window of FIG. 6; however for illustrative purposes it is assumed that the top ranked URL (URL number 1) has been clicked. Accordingly, a Web page accessed by this URL is displayed as a foreground window on display 12, and is shown in FIG. 7. The Web page shown in FIG. 7 provides an explanation about "Tomo Miyahira" in English. The resulting text is displayed in the window of FIG. 7.

Figure 8:
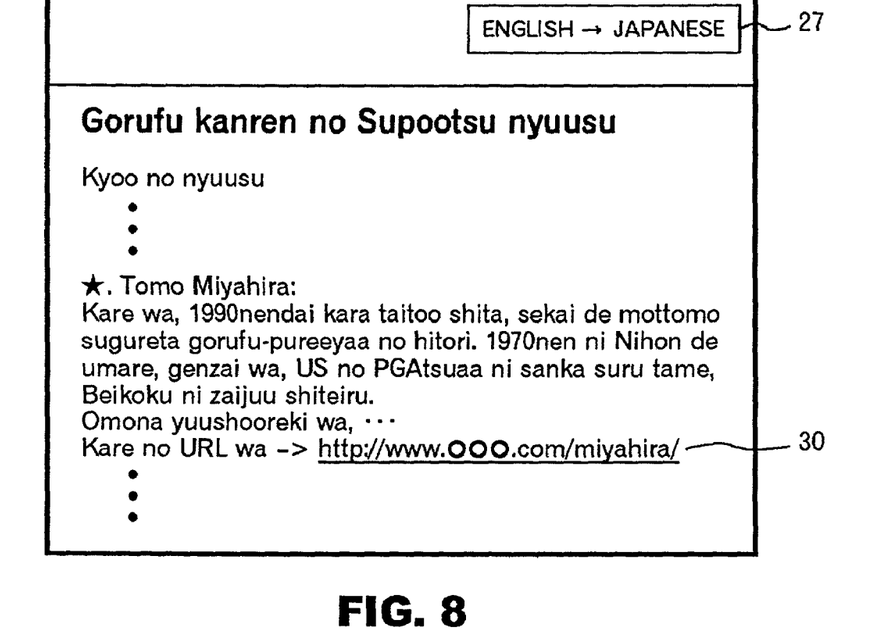
FIG. 8 is a diagram showing a window displayed when English-to-Japanese translation is instructed for English language text in the window of FIG. 7 according to one embodiment of the invention.
Figure 9:
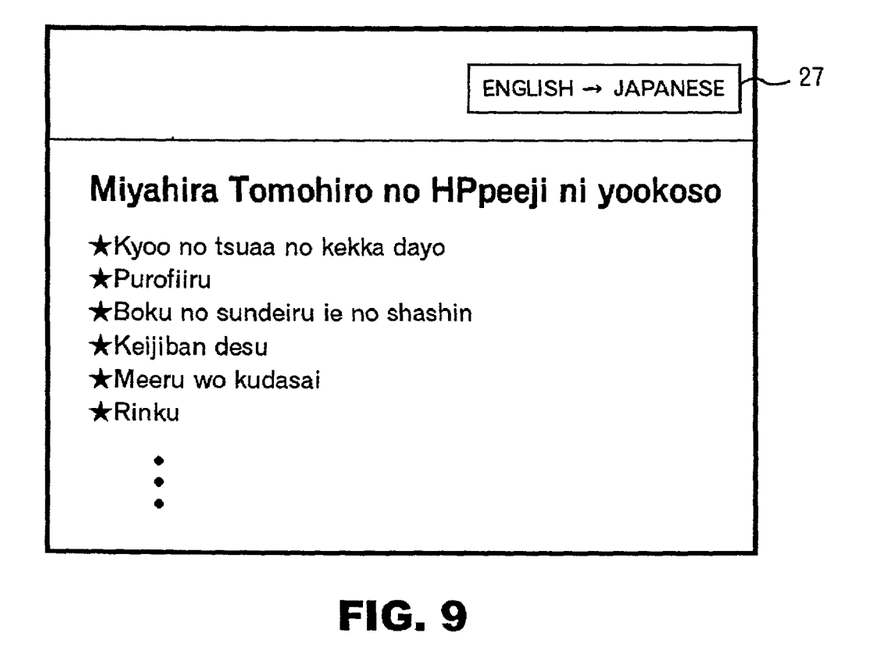
FIG. 9 is a diagram showing a window displayed when a hypertext link is clicked in the window of FIG. 8 according to one embodiment of the invention.
Figure 10:
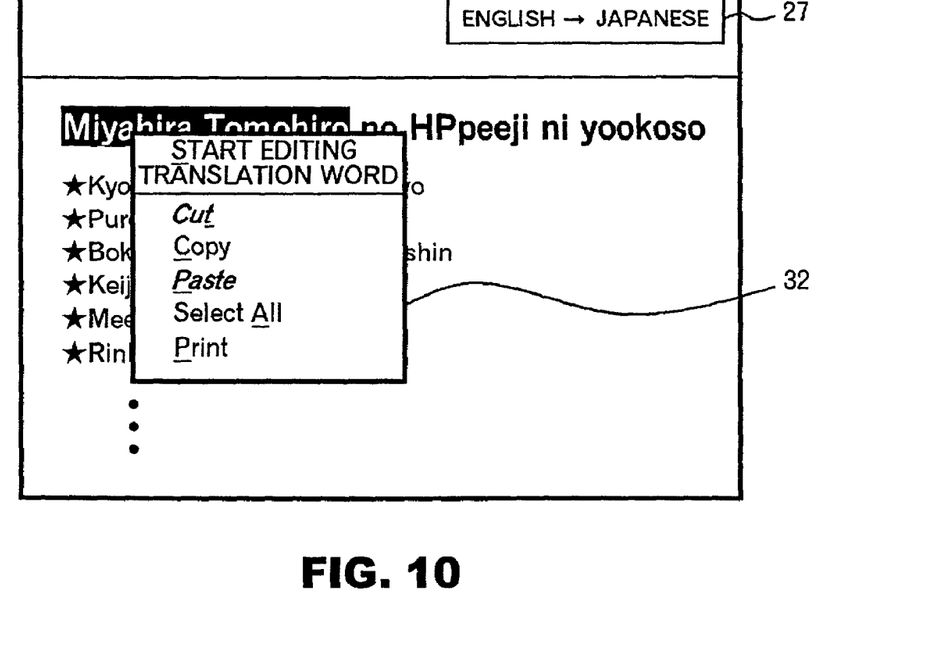
FIG. 10 is a diagram showing a window and menu displayed when a right mouse click is performed in the window of FIG. 9 according to one embodiment of the invention.

In each of the windows shown in FIG. 4 through FIG. 7, translation execution button 27 is shown in the icon bar area of the window. English language text displayed in a window is translated into a Japanese language text when user 15 instructs translation by the English-to-Japanese translation system concerned by clicking translation execution button 27. When user 15 clicks translation execution button 27, the English language text displayed in the window of FIG. 7 is translated and a window of resulting translated Japanese language text shown in FIG. 8 is displayed as a foreground window on display 12. Since "Tomo Miyahira" is not registered in the sports domain dictionary in the English-to-Japanese translation system concerned, this unknown word remains in the original language representation in the Japanese language text in the window of FIG. 8. The user 15 knows, from the Japanese language text in the window of FIG. 8, that "Tomo Miyahira" is the name of a Japanese person, and that a URL for this name exists. The URL in the translated text is underlined to alert user 15 that the URL is a hyperlinked URL 30. When user 15 clicks the hyperlinked URL 30, a Web page shown in FIG. 9 is displayed as a foreground window on display 12. The Web page displayed in the window of FIG. 9 is a Japanese language Web page and is accessed by clicking URL 30 shown in FIG. 8. The user 15 knows, from the Web page displayed in the window of FIG. 9, that "Tomo Miyahira" is a person named "Miyahira Tomohiro" in the Japanese language, and determines that the translation word for "Tomo Miyahira" is "Miyahira Tomohiro". The user 15 then selects the character string "Miyahira Tomohiro" in the window of FIG. 9 and clicks the right button of mouse 14 (FIG. 1). This right click causes a pop-up menu 32 to be displayed as shown in FIG. 10. In pop-up menu 32, it is possible to select one of the following menu items: "Start editing translation word", "Cut", "Copy", "Paste", "Select All" and "Print". In this context, however, "Cut" and "Paste" cannot be selected as the operations specified by these menu items cannot currently be performed in the window of FIG. 9. The menu items which cannot be selected are grayed out in the actual pop-up menu 32, and are shown in italics for the sake of clarity in FIG. 10. The user 15 selects "Start editing translation word" in pop-up menu 32 of FIG. 10. The pop-up menu 32 then disappears, and a translation word editing box 33, which allows efficient translation word editing, is displayed as shown in FIG. 11.

Figure 11:
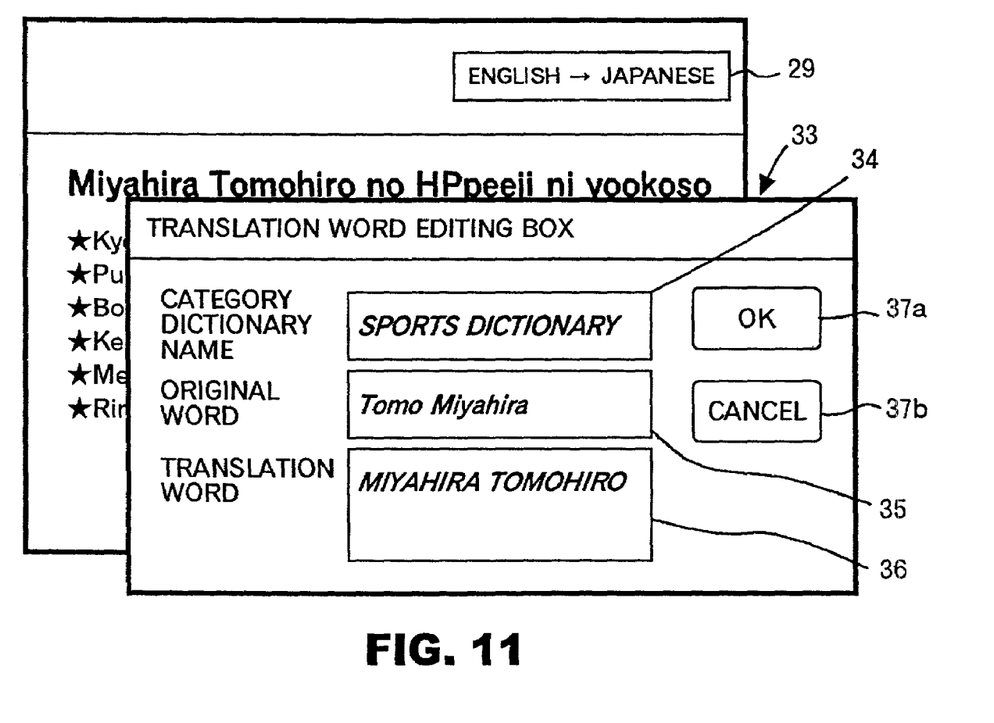
FIG. 11 is a diagram showing a window and word editor displayed when "START EDITING TRANSLATION WORD" is selected from the menu of FIG. 10 according to one embodiment of the invention.

In the translation word editing box 33 shown in FIG. 11, a category dictionary name input field 34, an original word input field 35 and a translation word input field 36 are provided as editing box components, and an OK button 37a and a cancel button 37b are provided as instruction components. Since the English-to-Japanese translation system concerned began using the sports domain dictionary when the translated text shown in FIG. 5 was created, the sports dictionary is automatically placed in category dictionary name input field 34. Since user 15 had selected the word "Tomo Miyahira" in the window of FIG. 5, this word is automatically placed in original word input field 35. Also, the character string "Miyahira Tomohiro" is automatically placed in translation word input field 36 as user 15 selected this character string in the window of FIG. 9. The italic type of the characters in category dictionary name input field 34, original word input field 35 and translation word input field 36 signifies that these characters have not been typed by user 15, but rather that these characters have been automatically placed there by the English-to-Japanese translation system concerned. These automatically placed characters are grayed out in the actual translation word editing box 33, and are shown in italic type for the sake of distinction in FIG. 11.

As will be explained below with reference to FIG. 14, the English-to-Japanese translation system concerned provides dictionaries 48 including a system (basic) dictionary 48a, domain dictionaries 48b and a user dictionary 48c. The contents of system dictionary 48a and domain dictionaries 48b may not be altered by user 15. Only the contents of user dictionary 48c may be edited by user 15. It should be noted that, even though "sports dictionary" has been placed in category dictionary name input field 34, the translation word placed in translation word input field 36 will be registered in user dictionary 48c, not in the sports dictionary included in domain dictionaries 48b. User dictionary 48c may be used for registering words not found in other dictionaries and corresponding translation words as well as information about a relationship or association between a translation word and a corresponding subject matter field.

Figure 12:
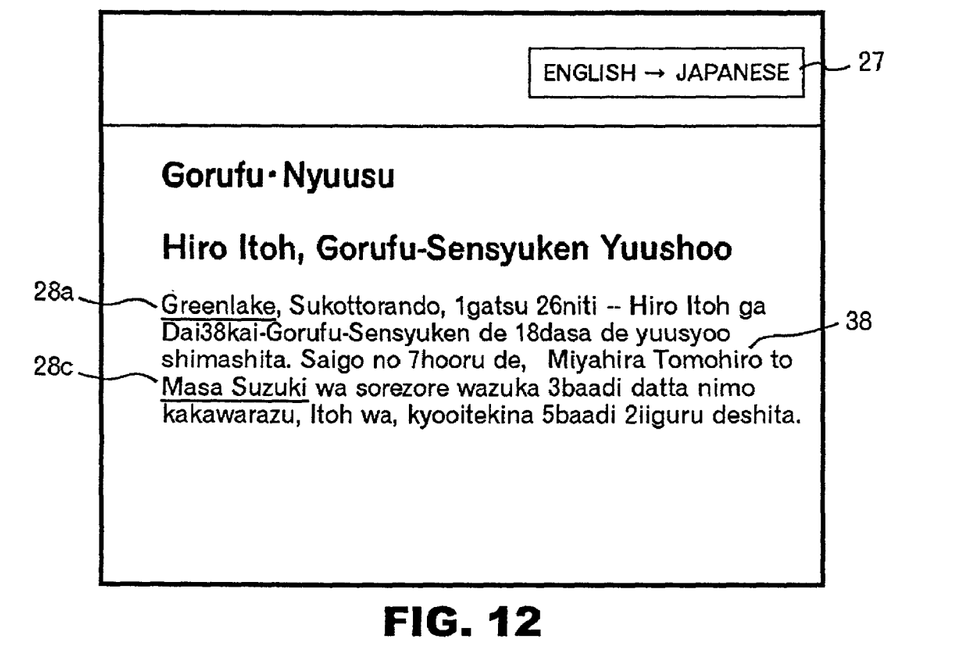
FIG. 12 is a diagram showing a window where a re-translation of the English language Web page of FIG. 4 is displayed according to one embodiment of the invention.

User 15 may perform editing in translation word editing box 33, and when finished, user 15 left-clicks OK button 37a, and the contents of translation word editing box 33 are registered in user dictionary 48c. Once these contents have been registered, the English-to-Japanese translation system concerned re-translates either the original English language text displayed in the window of FIG. 4, or only unknown word 28b, "Tomo Miyahira", in the window of FIG. 5, closes the window of FIG. 6 and a window of resulting re-translated Japanese language text shown in FIG. 12 is displayed as a foreground window on display 12. Translation word registration for "Tomo Miyahira" causes unknown word 28b in the translated text displayed in the window of FIG. 5 to be replaced in the re-translated text displayed in the window of FIG. 12 by known word 38, "Miyahira Tomohiro". The user 15 also searches for appropriate translation words for unknown words 28a and 28c displayed in the window of FIG. 5, registers these translation words in user dictionary 48c using a similar process to that described above for unknown word 28b and instructs re-translation to successively reduce the quantity of unknown words.

Figure 13:
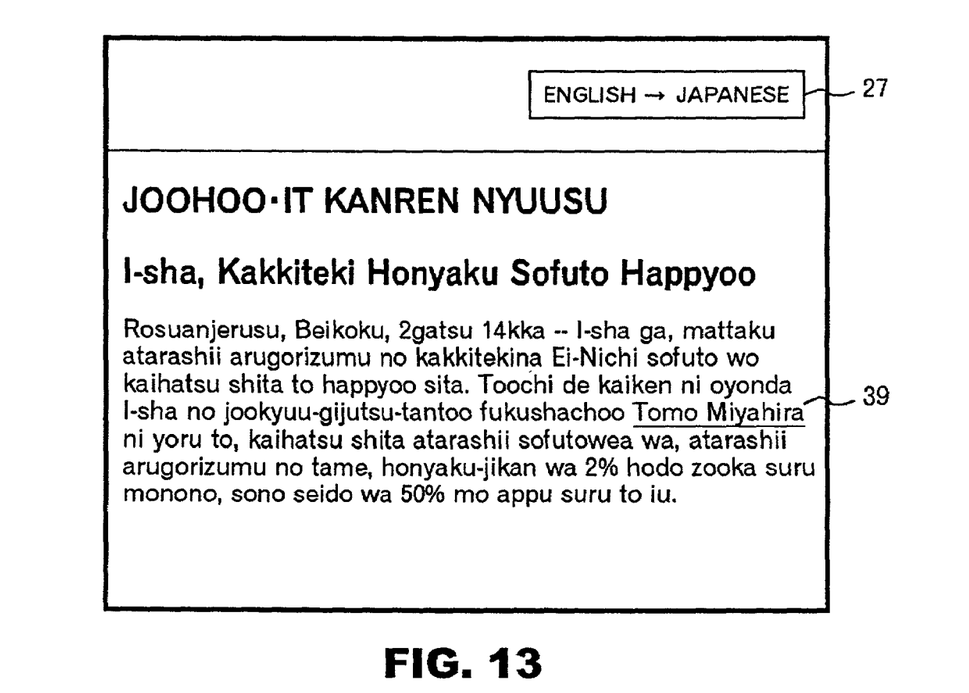
FIG. 13 is a diagram showing a window where a translation of a different English language Web page is displayed according to one embodiment of the invention.

FIG. 13 shows a window of translated Japanese language text when user 15 has instructed the English-to-Japanese translation system concerned to translate a different English language Web page than that which is shown in FIG. 4. The English-to-Japanese translation system concerned has detected the field of business as being relevant to the subject matter of the text of this Web page, which is different than the field of sports. "Tomo Miyahira" is unknown with respect to the field of business in user dictionary 48c, and is therefore displayed as unknown word 39 in the window of FIG. 13. In a manner similar to the process described above for unknown word 28b, user 15 clicks unknown word 39 to conduct a search by field for an appropriate translation word for "Tomo Miyahira", and registers the translation word for "Tomo Miyahira" in user dictionary 48c in association with the field of business. In the field of business, a person named "Tomo Miyahira" may be "Miyahira Tomokazu" rather than "Miyahira Tomohiro" as in the field of sports.

Figure 14:
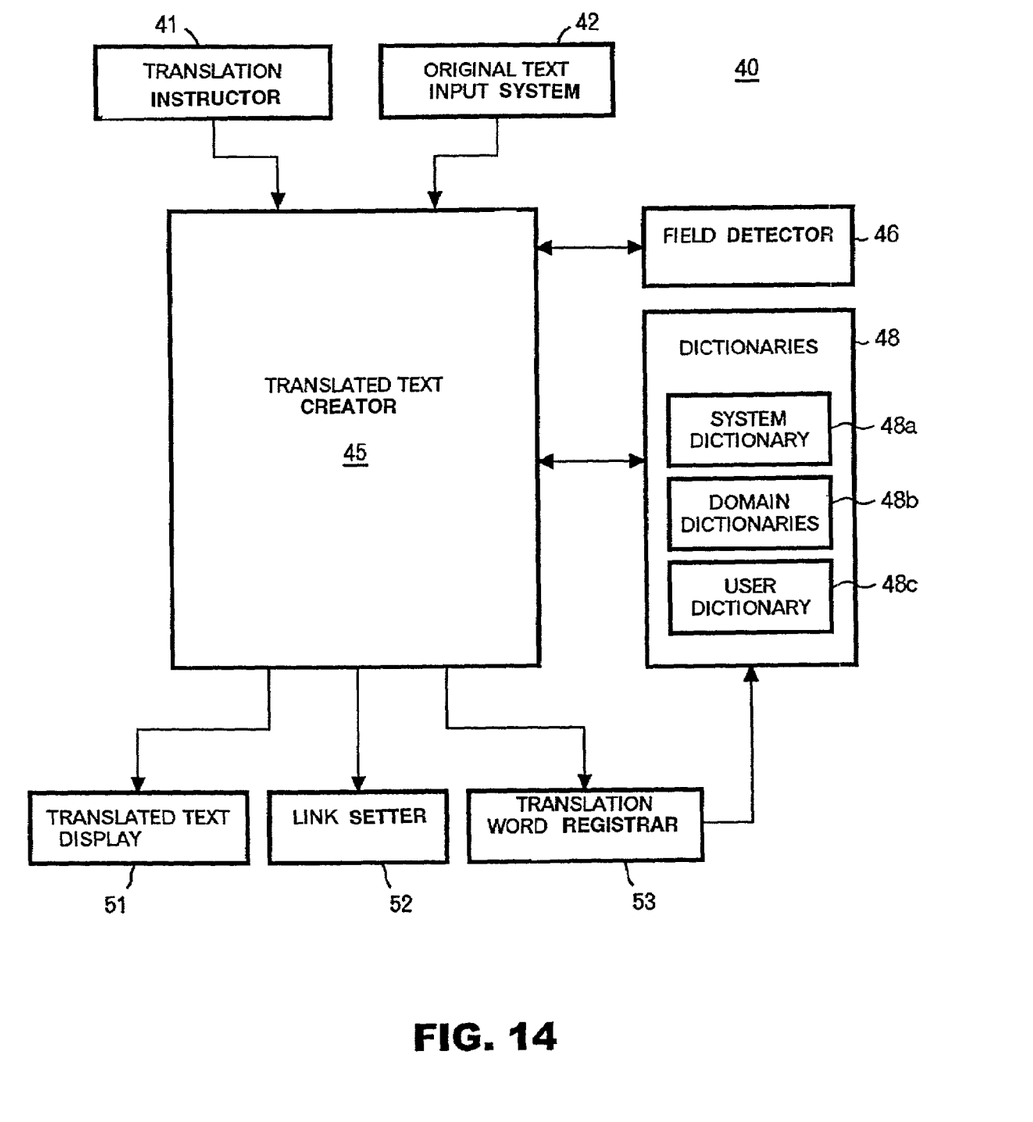
FIG. 14 is a high level system diagram illustrating a machine translation system according to one embodiment of the invention.

FIG. 14, as stated above, is a high level system diagram illustrating a machine translation system 40. Translation instructor 41 issues an instruction for translation from English to Japanese to translated text creator 45 in response to an instruction from user 15 or automatically in a predetermined manner. Original text input system 42 may be any system for inputting an original English language text into translated text creator 45, such as keyboard 13, a character recognition device or a speech recognition device as well as a Web page. The translated text creator 45 translates an original text in a first language, in one example English, into a translated text in a second language, in one example Japanese, or in other words, creates a translated text by using field detector 46 and dictionaries 48. The dictionaries 48 comprise a system dictionary 48a, a plurality of domain dictionaries 48b and at least one user dictionary 48c. The system dictionary 48a and domain dictionaries 48b cannot be altered, for example by rewriting and/or supplementing, by user 15; however user dictionary 48c may be edited by user 15. The registered contents of system dictionary 48a, domain dictionaries 48b and user dictionary 48c comprise translation words, grammatical rules, phrases and other information. Upon receiving a translation instruction from translation instructor 41, translated text creator 45 sends field detector 46 an original text from original text input system 42, instructs field detector 46 to detect a field relevant to a subject matter of the original text and receives the result of the detection. A subject matter field detected by field detector 46 corresponds to a field of one of the domain dictionaries 48b described below. Subsequently, translated text creator 45 selects one of domain dictionaries 48b having a field that corresponds to the subject matter field detected by field detector 46 for use in translation processing, and sets the usage priority level of the selected one of domain dictionaries 48b, higher than that of system dictionary 48a. The usage priority of dictionaries 48 which translated text creator 45 uses for translation processing is, from highest to lowest priority: user dictionary 48c, the selected one of domain dictionaries 48b and system dictionary 48a. Words, compound words, grammatical rules and phrases in the original text are first collated with the dictionary having the highest priority level. If a corresponding item is found in this dictionary, the item is used, but if no corresponding item is found, the dictionary used for collation is switched to one of the next lower priority level. If a translation word for a word or compound word in the original text is not found in user dictionary 48c, the selected one of domain dictionaries 48b or system dictionary 48a, translated text creator 45 creates the translated text without translating that word or compound word (hereinafter referred to as "unknown word"). Translated text display 51 displays the translated text in Japanese created by translated text creator 45, on display 12. In the displayed, translated text, the unknown word which has not been translated by translated text creator 45 remains in an original language representation. Link setter 52 receives information about the field of the selected one of domain dictionaries 48b, or the subject matter field detected by field detector 46, from translated text creator 45. Link setter 52 then sets a link for performing a search in a search field relating to a selected Internet search engine and corresponding to a field relevant to a subject matter of the unknown word in the translated text displayed by translated text display 51. The Internet search engine to which the link is set may be specified without regard to the field relevant to a subject matter of the unknown word. However, the link may also be set to a different Internet search engine depending on the field relevant to a subject matter of the unknown word. Translation word registrar 53 registers, in user dictionary 48c, the contents of translation word editing box 33 shown in FIG. 11 comprising contents of category dictionary name input field 34, original word input field 35 and translation word input field 36, as well as a relationship between the translation word and a field relevant to a subject matter thereof. After translation word registrar 53 has completed registering the translation word in user dictionary 48c, and user 15 again clicks translation execution button 27 shown in the English language text window of FIG. 4, a window of re-translated Japanese language text containing the newly registered translation word is displayed as a foreground window on display 12 as shown, for example, in the window of FIG. 12.

Figure 15:
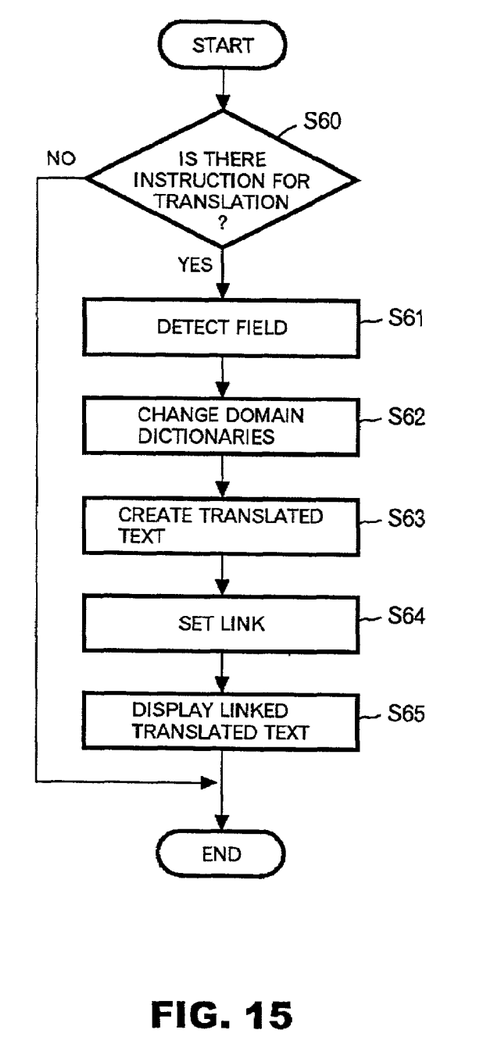
FIG. 15 is a flow diagram illustrating a translation program according to one embodiment of the invention.

FIG. 15 is a flow diagram illustrating a translation program of the invention. At step S60, it is determined whether there is an instruction for translation from user 15. The program proceeds to step S61 if the decision is "YES", while the program is ended if "NO". At step S61, a field relevant to a subject matter of the original text to be translated is detected by field detector 46 (shown in FIG. 14). At step S62, domain dictionary changing is performed, if necessary, to select one of domain dictionaries 48b having a field which corresponds to the field detected at step S61. After this changing, the selected one of domain dictionaries 48b has a priority level for collation of the original text set higher than that of system dictionary 48a, and the priority level of dictionaries 48 becomes, from highest to lowest priority level: user dictionary 48c, the selected one of domain dictionaries 48b and system dictionary 48a. At step S63, the original text is translated using dictionaries 48 to create a translated text. At step S64, a link is set for an unknown word for which a translation word has not been found, if such an unknown word is contained in the original text. The link that is set points to a particular search field of a selected Internet search engine which corresponds to the field detected at step S61. At step S65, the translated text in which the link has been set for the unknown word is displayed on display 12.

Figure 16:
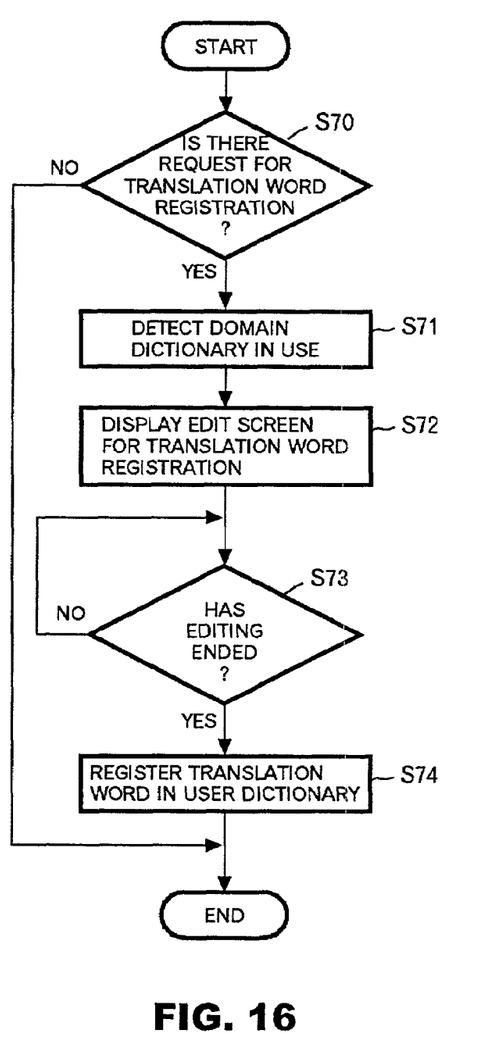
FIG. 16 is a flow diagram illustrating a translation word registration program according to one embodiment of the invention.

FIG. 16 is a flow diagram illustrating a translation word registration program of the invention. At step S70, it is determined whether "START EDITING TRANSLATION WORD" has been selected in pop-up menu 32 shown in FIG. 10, that is, whether a request for registering a translation word has been issued. The program proceeds to step S71 if the decision is "YES", while it is ended if "NO". At step S71, the field of the selected one of domain dictionaries 48b is detected. This field corresponds to a field which is relevant to a subject matter of the original text last translated by machine translation system 40. At step S72, translation word editing box 33 (shown in FIG. 11) is displayed on display 12. The user 15 may perform editing for the unknown word in translation word editing box 33. At step S73, it is determined whether translating word editing by user 15 has ended, that is, whether user 15 has clicked OK button 37a in translation word editing box 33. If the determination is "YES", the program proceeds to step S74. At step S74, the translation word is registered in user dictionary 48c in association with the field detected at step S71.

What is claimed is:

1. A machine translation system comprising:
   a translated text creator for creating a translated text in which an original text in a first language is translated into said translated text in a second language while an unknown word not registered in at least one dictionary is left in said first language;
   a translated text display for displaying said translated text created by said translated text creator; and
   a link setter for setting a link for said unknown word in said first language in said translated text displayed by said display for which an instruction is provided, such that a search for said unknown word in said first language is conducted using said unknown word as a search word in a predetermined Internet search engine based on said first language.

2. The machine translation system of claim 1, further comprising a field detector for detecting a field relevant to a subject matter of said original text, wherein said link setter sets said link for said unknown word in said first language so as to search for said unknown word in one of a plurality of search fields of said Internet search engine which corresponds to said field detected by said field detector.

3. The machine translation system of claim 2, wherein said link setter stores settings about said Internet search engine which are to be used for searching for said unknown word for each of said fields detected by said field detector.

4. The machine translation system of claim 2, further comprising:
   a search result list display for displaying a search result list of Web pages relevant to said unknown word as found by said Internet search engine in response to said instruction given by a user for executing said search for said unknown word for which said link has been set by said link setter;
   an unknown word related Web page display for displaying a Web page which has been selected from said search result list by said user; and
   a translation word registrar for generating a translation word registration screen which allows said user to edit and register a translation word for said unknown word, and for registering said translation word in said at least one dictionary, in association with said field relevant to said subject matter of said original text which contains said unknown word.

5. The machine translation system of claim 1, further comprising a search engine changer for changing said Internet search engine to which said link is set by said link setter.

6. The machine translation system of claim 1, further comprising:
   a search result list display for displaying a search result list of Web pages relevant to said unknown word as found by said Internet search engine in response to said instruction given by a user for executing said search for said unknown word for which said link has been set by said link setter;
   an unknown word related Web page display for displaying a Web page which has been selected from said search result list by said user; and
   a translation word registrar for generating a translation word registration screen which allows said user to edit and register a translation word for said unknown word, and for registering said translation word for said unknown word in said at least one dictionary.

7. The machine translation system of claim 6, further comprising an unknown word related Web page translator for translating said Web page displayed by said unknown word related Web page display, into said second language.

8. The machine translation system of claim 6, further comprising a re-translation controller for instructing re-translation of said original text containing said unknown word after said translation word registrar has performed registration of said translation word for said unknown word.

9. A machine translation method comprising:
   creating a translated text in which an original text in a first language is translated into said translated text in a second language while an unknown word not registered in at least one dictionary is left in said first language;
   displaying said translated text; and
   setting a link for said unknown word in said first language in said translated text displayed by said displaying of said translated text for which an instruction is provided, such that a search for said unknown word in said first language is conducted using said unknown word as a search word in a predetermined Internet search engine based on said first language.

10. The machine translation method of claim 9, further comprising detecting a field relevant to a subject matter of said original text, wherein said setting of said link sets said link for said unknown word in said first language so as to search for said unknown word in one of a plurality of search fields of said Internet search engine which corresponds to said field detected by said detecting of said field.

11. The machine translation method of claim 10, wherein said setting of said link stores settings about said Internet search engine which are to be used for searching for said unknown word for each of said fields detected by said detecting of said field.

12. The machine translation method of claim 10, further comprising:
   displaying a search result list of Web pages relevant to said unknown word as found by said Internet search engine in response to said instruction given by a user for executing said search for said unknown word for which said link has been set by said setting of said link;
   displaying an unknown word related Web page which has been selected from said search result list by said user; and generating a translation word registration screen which allows said user to edit and register a translation word for said unknown word, and registering said translation word in said at least one dictionary, in association with said field relevant to said subject matter of said original text which contains said unknown word.

13. The machine translation method of claim 9, further comprising changing said Internet search engine to which said link is set by said setting of said link.

14. The machine translation method of claim 9, further comprising:
   displaying a search result list of Web pages relevant to said unknown word as found by said Internet search engine in response to said instruction given by a user for executing said search for said unknown word for which said link has been set by said setting of said link;
   displaying an unknown word related Web page which has been selected from said search result list by said user; and
   generating a translation word registration screen which allows said user to edit and register a translation word for said unknown word, and registering said translation word for said unknown word in said at least one dictionary.

15. The machine translation method of claim 14, further comprising translating said unknown word related Web page displayed by said displaying of said unknown word related Web page, into said second language.

16. The machine translation method of claim 14, further comprising instructing re-translation of said original text containing said unknown word relevant to said translation word after said translation word has been registered by said registering of said translation word.

17. A machine translation program usable by a computer to cause said computer to:
   create a translated text in which an original text in a first language is translated into said translated text in a second language while an unknown word not registered in at least one dictionary is left in said first language;
   display said translated text; and
   set a link for said unknown word in said first language in said translated text displayed by said displaying of said translated text for which an instruction is provided, such that a search for said unknown word in said first language is conducted using said unknown word as a search word in a predetermined Internet search engine based on said first language.

18. The machine translation program of claim 17, further causing said computer to detect a field relevant to a subject matter of said original text, wherein said setting of said link sets said link for said unknown word in said first language so as to search for said unknown word in one of a plurality of search fields of said Internet search engine which corresponds to said field detected by said detecting of said field.

19. The machine translation program of claim 18, wherein said setting of said link stores settings about said Internet search engine which are to be used for searching for said unknown word for each of said fields detected by said detecting of said field.

20. The machine translation program of claim 18, further causing said computer to:
   display a search result list of Web pages relevant to said unknown word as found by said Internet search engine in response to said instruction given by a user for executing said search for said unknown word for which said link has been set by said setting of said link;
   display an unknown word related Web page which has been selected from said search result list by said user; and
   generate a translation word registration screen which allows said user to edit and register a translation word for said unknown word, and register said translation word in said at least one dictionary, in association with said field relevant to said subject matter of said original text which contains said unknown word.

21. The machine translation program of claim 17, further causing said computer to change said Internet search engine to which said link is set by said setting of said link.

22. The machine translation program of claim 17, further causing said computer to:
   display a search result list of Web pages relevant to said unknown word as found by said Internet search engine in response to said instruction given by a user for executing said search for said unknown word for which said link has been set by said setting of said link;
   display an unknown word related Web page which has been selected from said search result list by said user; and
   generate a translation word registration screen which allows said user to edit and register a translation word for said unknown word, and register said translation word for said unknown word in said at least one dictionary.

23. The machine translation program of claim 22, further causing said computer to translate said unknown word related Web page displayed by said displaying of said unknown word related Web page, into said second language.

24. The machine translation program of claim 22, further causing said computer to instruct re-translation of said original text containing said unknown word relevant to said translation word after said translation word has been registered by said registering of said translation word.

* * * * *